United States Patent [19]
Bunch

[11] Patent Number: 5,957,694
[45] Date of Patent: Sep. 28, 1999

[54] CANINE ABDOMINAL PALPATION SIMULATOR

[76] Inventor: Susan E. Bunch, 6413 Deerview Dr., Raleigh, N.C. 27606

[21] Appl. No.: 08/885,413

[22] Filed: Jun. 30, 1997

[51] Int. Cl.⁶ .................................................. G09B 23/28
[52] U.S. Cl. .......................... 434/262; 434/267; 434/272; 434/275
[58] Field of Search ........................... 434/262, 265–275, 434/86

[56] References Cited

U.S. PATENT DOCUMENTS

| | | | |
|---|---|---|---|
| 4,001,951 | 1/1977 | Fasse | 434/267 |
| 4,087,933 | 5/1978 | Strongin | 446/183 |
| 4,411,629 | 10/1983 | Voighst | 434/266 |
| 4,439,162 | 3/1984 | Blaine | 434/268 |
| 4,773,865 | 9/1988 | Baldwin | 434/268 |
| 4,867,686 | 9/1989 | Goldstein | 434/267 |
| 5,006,089 | 4/1991 | Lee | 446/267 |
| 5,518,407 | 5/1996 | Greenfield et al. | 434/272 |

OTHER PUBLICATIONS

"Evaluation of Video Tape and Simulator for Instruction of Basic Surgery Skills", Veterinary Surgery, vol. 20, No. 1 1991.

"Comparison of Surgical Skills of Veterinary Students Trained Using Models or Live Animals", JAVMA, vol. 206, No. 12, 1995.

"Models Organs for Veterinary Students", Canine Practice, vol. 20, No. 2, 1995.

Advertisement entitled "Vascular Training Models", UC Davis, undated.

"NASCO Health Care Educational Materials 1997/98 Catalog", pp. 15, 21, 24, 31, 50 and 62, undated.

"A Non–Animal ALternative For Teaching Introductory Surgery", Humane Innovations And Alternatives, vol. 8, pp. 635–636 1994.

*Primary Examiner*—Kien T. Nguyen
*Assistant Examiner*—John Edmund Rovnak

[57] ABSTRACT

A simulator (10) for use by veterinary students in developing manual palpation skills comprises a canine body (12) with internal artificial organs (30–40) connected to feedback devices (60–70) controlled by switches (46–56).

18 Claims, 2 Drawing Sheets

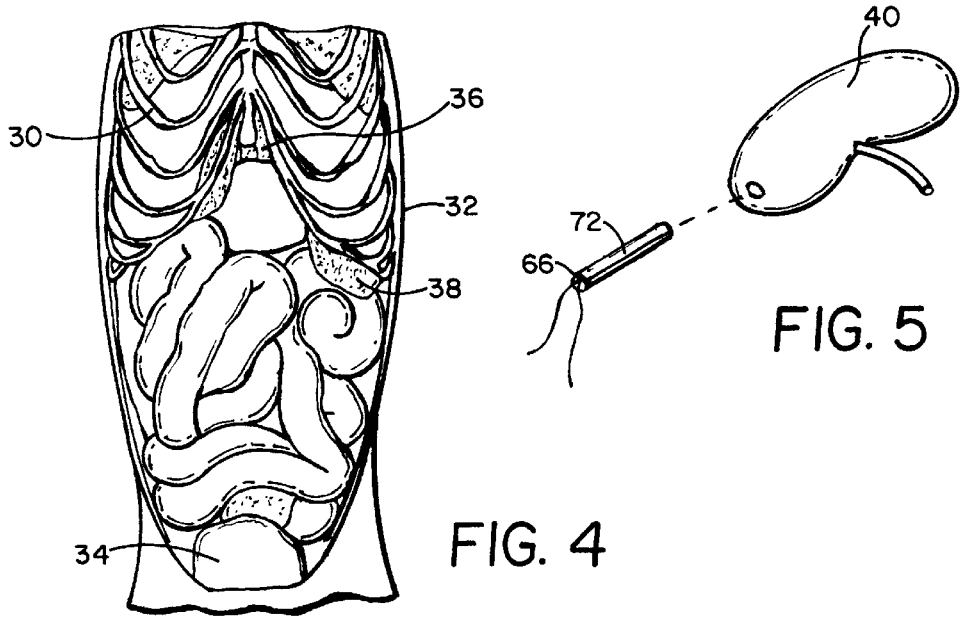
FIG. 4
FIG. 5
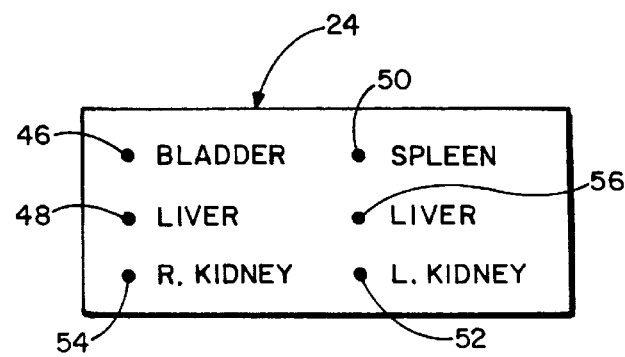
FIG. 6
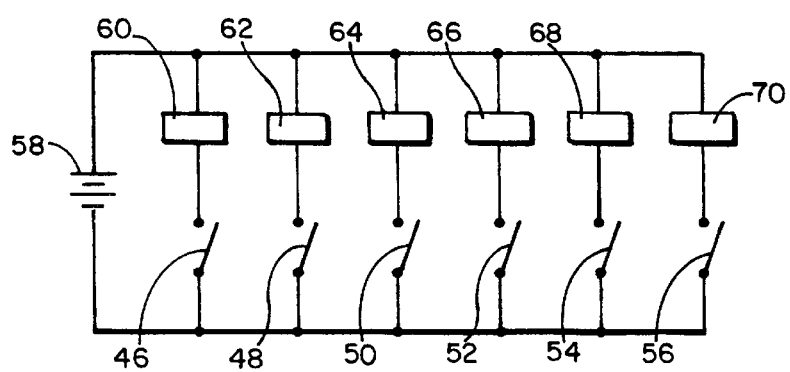
FIG. 7

CANINE ABDOMINAL PALPATION SIMULATOR

TECHNICAL FIELD

The present invention relates generally to medical training devices or simulators. More particularly, this invention pertains to a canine simulator with positive feedback for teaching abdominal palpation techniques to veterinary students.

BACKGROUND ART

Palpation is an important diagnostic technique that involves feeling the part to be examined and comparing that to the feel of a 'normal' organ. This of course requires a knowledge of the location, size and texture of the organs, both normal and abnormal.

Abdominal palpation is an especially important part of every physical examination in veterinary diagnosis with animal patients. It is also essential to the successful collection of laboratory specimens, such as urine, for analysis.

Unfortunately, this important and universally used technique is difficult for students to master. It is one thing to learn theory from anatomy texts, lectures and video tapes, and quite another to practice it on live animals. Palpation of formalin fixed anatomy specimens is artificial and of limited value. While palpation of live animals is realistic, it does not afford students the opportunity to obtain direct feedback as to whether what they think they are palpating is what they are in fact palpating. It is difficult for a student to palpate and visualize abdominal structures concurrently. The student and instructor cannot both palpate the same structure simultaneously. Translation of palpation theory to actual practice can thus lead to anxiety on the part of both the student and the animal.

Although various simulators have been available heretofore for practicing techniques such as CPR, intubation, suture tying, etc. on human patients, there has not been available a simulator for practicing palpation on animals. A need has thus arisen for a canine abdominal palpation simulator.

SUMMARY OF INVENTION

The present invention comprises a canine abdominal palpation simulator that overcomes the foregoing and other difficulties associated with the prior art. In accordance with the invention there is provided a simulator by which abdominal palpation techniques can be learned, with direct concurrent feedback, before practice on live animals.

BRIEF DESCRIPTION OF DRAWING

A better understanding of the invention can be had by reference to the following Detailed Description in conjunction with the accompanying Drawing, wherein:

FIG. 4 is a partial bottom view (cutaway);

FIG. 5 is an exploded view showing an internal organ with a vibrator therein;

FIG. 6 is a view of the control panel; and

FIG. 7 is a schematic diagram of the control circuitry.

DETAILED DESCRIPTION

Figure 1:
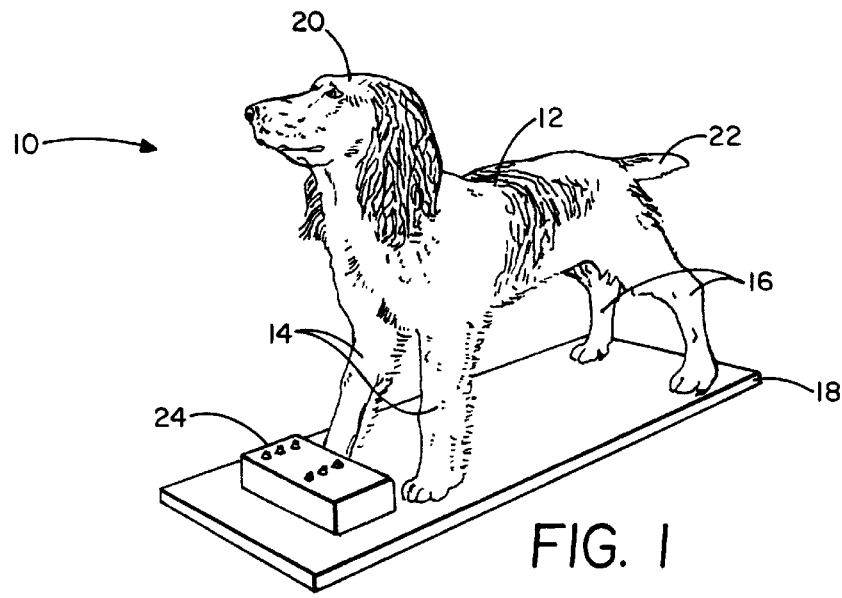
FIG. 1 is a perspective view of a canine abdominal palpation simulator incorporating the invention.

Referring now to the Drawing, wherein like reference numerals designate like or corresponding elements throughout the views, and particularly referring to FIG. 1, there is shown the canine simulator 10 of the present invention. As will be explained more fully hereinafter, the simulator 10 is particularly useful for teaching abdominal palpation and other diagnostic and therapeutic skills to veterinary students. The simulator 10 could also be used by others such as pet owners, graduate veterinarians, veterinary technicians and laboratory animal caregivers.

The simulator 10 consists of a three-dimensional simulated animal body 12 with front legs 14 and rear legs 16 supported on a base 18. The body 12 is sized to resemble an average, life-size dog or canine. In the preferred embodiment, the body 12 approximates the dimensions of a typical 35 to 40 pound Springer Spaniel, although the particular breed is not critical to practice of the invention.

If desired, a head 20 and a tail 22 can also be provided on the body 12 for additional realism.

A control box 24 is also provided on the base 14. The control box 24 contains various switches and circuitry for controlling the tactile feedback that confirms the identity of the artifical organ within body 12 which is being palpated by the student.

Figure 2:
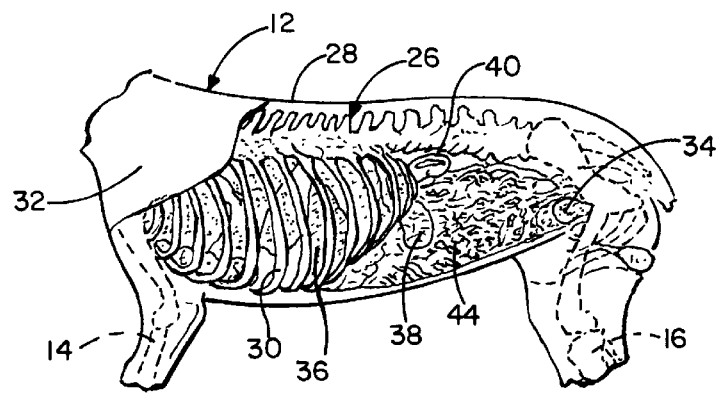
FIG. 2 is a partial left side view (cutaway)
Figure 3:
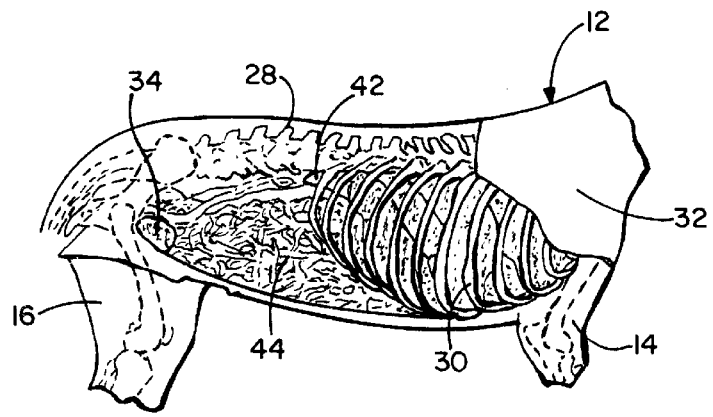
FIG. 3 is a partial right side view (cutaway)

The constructional details of body 12 are best seen in FIGS. 2–4. The body 12 includes a skeletal frame 26 consisting of a synthetic spine 28, legs 14 and 16, and ribs 30. In the preferred embodiment, the frame 26 is formed of substantially rigid members, such as aluminum rods arranged and interconnected to simulate a skeleton, although any suitable material can be used. If desired, plastic tubing of suitable size can be used to add contour to the legs 14 and 16.

The body 12 is covered by synthetic skin 32 approximating the musculature and haircoat of a canine, particularly in the abdominal region where most palpation occurs. Any suitable synthetic skin having such characteristics can be used. For example, in the preferred embodiment, the skin 32 can comprise two layers of plastic sheet material wrapped by a cloth backing with artificial hair on one side thereof. Polyethylene can be used for the plastic sheeting, with a layer of water-based lubricant therebetween to simulate viscosity of the fatty tissue underlying the dermis. Canvas with polyester fibers can be used for the cloth backing and artifical hair.

The synthetic skin 32 is preferably opaque to deter visual assistance during palpation, however, translucent areas may be provided for inspection if desired.

Various artificial or synthetic organs having the size and texture of the actual organs are provided in anatomically correct positions within the body 12, particularly the abdominal region. For example, in the preferred embodiment an artificial bladder 34, liver 36, spleen 38, left kidney 40, and right kidney 42 are provided. Any suitable artificial organs can be utilized. For example, such synthetic organs are available from the College of Veterinary Medicine, University of Illinois. The organs are preferably attached to and suspended from the frame 26, such as by sutures, and further supported by suitable filler 44 therebetween, allowing some relative movement for realism. For example, synthetic sponges wrapped with plastic and taped in place could be used for the filler 44.

If desired, additional synthetic organs, such as the colon and part of the small intestines, could also be provided within the body 12.

Feedback devices are connected to each of the organs 34–42 for signaling to the student when that organ is being palpated. In the preferred embodiment, such feedback devices comprise vibrators of the type used in pagers to provide immediate tactile feedback. Other suitable feedback devices, such as buzzers or lights could also be used.

Referring now to FIGS. 5–6, the control box 24 includes normally open switches 46–56 which are connected in series with a battery 58 for controlling activation of their respective feedback device. Switch 46 controls vibrator 60 connected to bladder 34. Switch 48 controls vibrator 62 connected to liver 36. Switch 50 controls vibrator 64 connected to spleen 38. Switch 52 controls vibrator 66 connected to left kidney 40. Switch 54 controls vibrator 68 connected to the right kidney 42. If desired, a second switch 56 and vibrator 70 can be provided for liver 36, for sensing palpation of a different lobe of the liver. Each vibrator is preferably encased in a sheath 72 that is attached to or inserted into the respective organ, as shown in FIG. 5.

When the student has located and palpated an organ, the respective switch is closed to provide positive confirmatory tactile feedback.

If desired, sensors could be connected to or located within the organs which would activate automatically in response to palpation, instead of selectively. Also, visual or aural feedback devices could be used instead of or in addition to tactile feedback devices.

From the foregoing, it will thus be understood that the present invention comprises a new and unique canine abdominal palpation simulator having several advantages over the prior art. One significant advantage is that students need not be concerned about causing possible discomfort to the animal, and can thus use the simulator repeatedly to gain confidence in their abilities. Once basic skills have been mastered, subsequent experiences with live animals would be less frustrating. Use of the simulator herein also avoids some of the issues surrounding the use of live animals in teaching laboratories. Other advantages will be evident to those skilled in the art.

The simulator 10 could be modified to broaden its application and utility. For example, normal organs could be exchanged with organs having subtle or dramatic abnormalities to further refine palpation skills. Fluid could be instilled into the bladder or into the abdominal cavity for learning laboratory specimen collection techniques. Percutaneous biopsy techniques could also be practiced, with the biopsied organs being replaced after they no longer resemble their original structure. Internal features beyond the abdominal cavity could be added for practicing techniques such as thoracic auscultation.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. A canine abdominal palpation teaching device, which comprises:
   a base;
   a simulated animal body mounted on said base, said body including a frame covered by a synthetic coat enclosing an abdominal cavity;
   at least one artifical organ supported within the abdominal cavity of said body in substantially anatomically correct position; and
   means connected to said artificial organ for generating feedback upon palpation of said organ.

2. The canine abdominal palpation device of claim 1, wherein the synthetic coat of said simulated animal body is substantially opaque.

3. The canine abdominal palpation device according to claim 2, wherein said animal body comprises a three-dimensional canine of average size.

4. The canine abdominal palpation device of claim 1, wherein said simulated animal body includes a head, a tail, and front and rear legs.

5. The canine abdominal palpation device of claim 1, wherein a plurality of artificial organs are supported in the abdominal cavity of said body, said organs being selected from the group consisting of a bladder, liver, spleen, and left and right kidneys.

6. The canine abdominal palpation device of claim 1, wherein said feedback generating means comprises:
   a vibrator connected to said artificial organ;
   a power supply; and
   switch means connected between said power supply and said vibrator for selectively energizing said vibrator to generate tactile feedback upon palpation of said organ.

7. The canine abdominal palpation device according to claim 1, wherein said switch means is mounted on said base, external to said animal body.

8. The canine abdominal palpation device of claim 1, further including filler material within the abdominal cavity of said body to further support said organ.

9. A simulator for teaching veterinary abdominal palpation skills, which comprises:
   a simulated animal body having a head, front legs, and rear legs;
   said body further including a frame covered by synthetic skin enclosing an abdominal cavity;
   a plurality of artifical organs supported within the abdominal cavity of said body in anatomically correct locations;
   filler material disposed between said organs and within the abdominal cavity of said body;
   a plurality of predetermined feedback devices connected to said organs; and
   control means including switches for activating the respective feedback device upon palpation of the respective organ.

10. The veterinary abdominal palpation device of claim 9, wherein the synthetic skin of said simulated animal body is substantially opaque.

11. The veterinary abdominal palpation simulator of claim 9, wherein the synthetic skin includes two layers of plastic sheet covered by a cloth backing with artificial hair on one side thereof.

12. The veterinary abdominal palpation simulator of claim 9, wherein said artificial organs are selected from the group consisting of a bladder, liver, spleen, and left and right kidneys.

13. The veterinary abdominal palpation simulator of claim 9, wherein said feedback devices comprise vibrators in order to provide tactile feedback.

14. The veterinary abdominal palpation simulator of claim 9, further including a base for supporting said simulated animal body.

15. A canine simulator for teaching veterinary abdominal palpation skills, which comprises:

a simulated canine body, said body including a frame covered by synthetic skin enclosing an abdominal cavity;

a plurality of artifical organs supported within the abdominal cavity of said body in anatomically correct locations;

said artificial organs being selected from a group consisting of a bladder, liver, spleen and kidneys;

filler material disposed between said organs and within the abdominal cavity of said body;

a plurality of vibrators connected to said organs; and control means including switches for selectively activating the respective vibrator upon palpation of the respective organ to provide tactile feedback.

16. The canine abdominal palpation simulator of claim 15, wherein said simulated canine body includes a head, a tail, and front and rear legs.

17. The canine abdominal palpation simulator of claim 15, wherein the synthetic skin of said canine body is substantially opaque.

18. The canine abdominal palpation simulator of claim 15, further including a base for supporting said canine body.

* * * * *